Patented May 15, 1928.

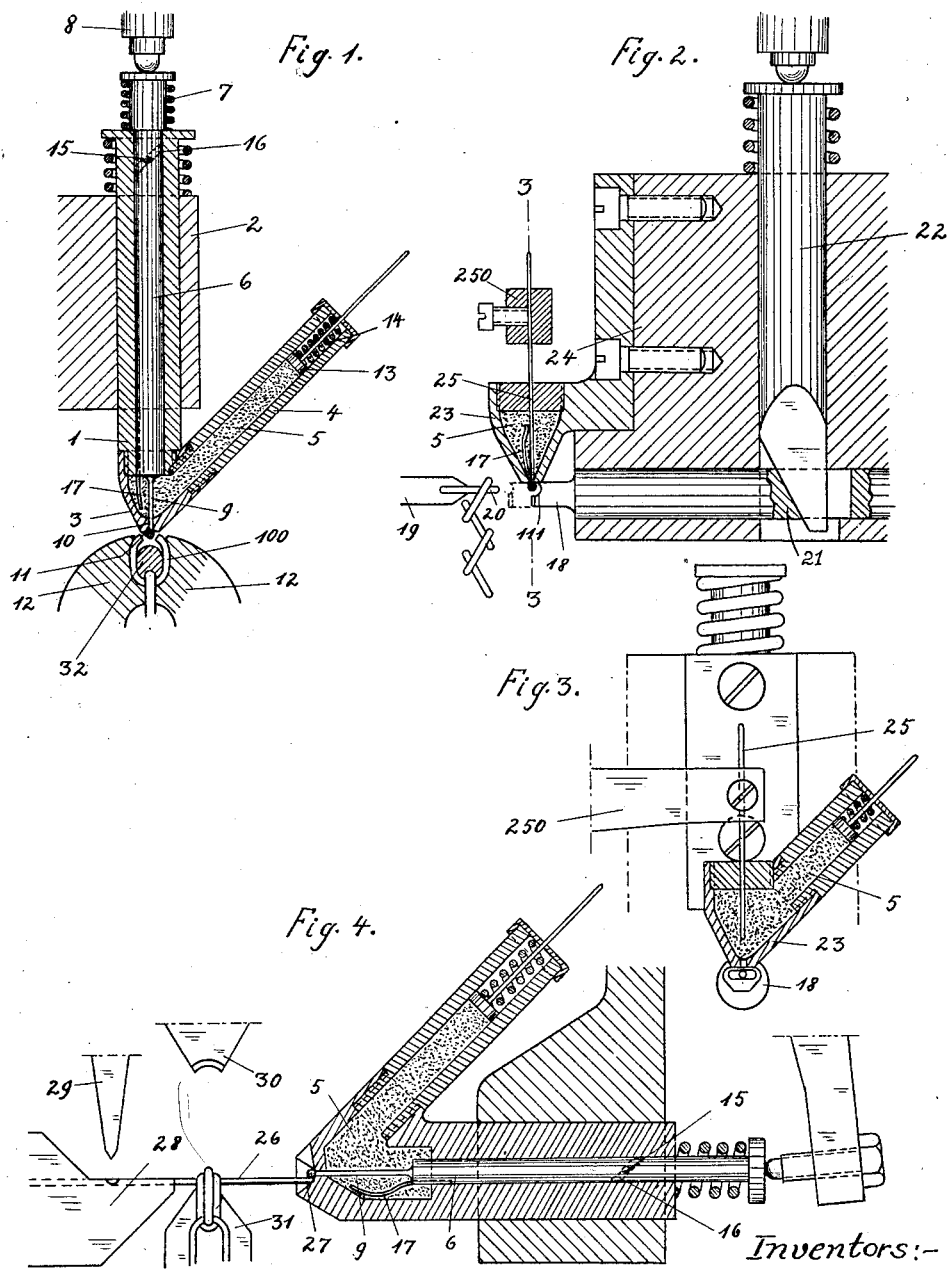

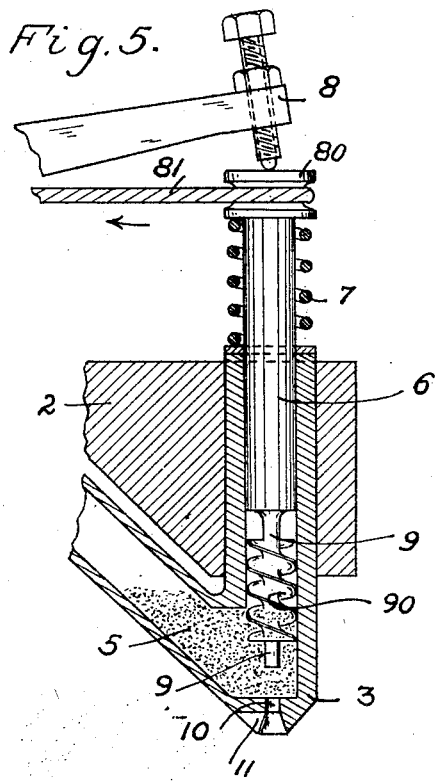
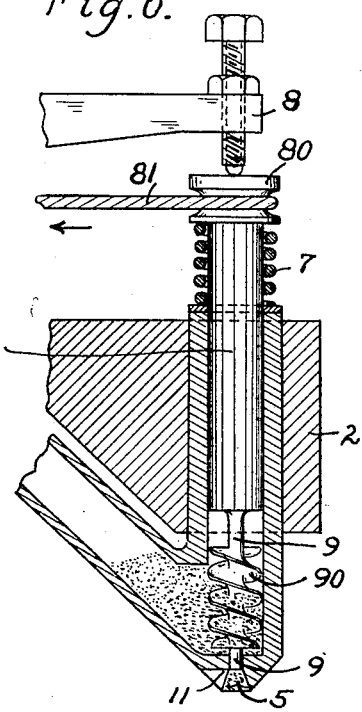

1,669,846

UNITED STATES PATENT OFFICE.

JONATHAN WENZ, JOSEF ALVERA, AND GEORG BRUNHÜBNER, OF PFORZHEIM, GERMANY.

SOLDERING MACHINE.

Application filed June 3, 1926, Serial No. 113,440, and in Germany June 9, 1925.

The present invention has reference to machines for forming the individual links of ornamental chains, mesh fabric, and the like, and for simultaneously soldering and shutting them, and it relates more particularly to improvements in that type of machine in which plastic solder is used, which is advanced automatically to the soldering point in measured amount and in timed relation to the formation of the links.

One object of our invention is to positively feed the solder paste to the link joint through one of the link forming or closing tools by a reciprocable pusher member which operates once for each link forming and closing operation; another object is to assure an ample and steady supply of solder at the point of feed, for which purpose special stirring means are provided within the solder container, which in addition to stirring the plastic solder also tends to feed it toward the solder extrusion passage. Our improvements over prior machines of this character consist mainly in the perfect control we have over the extrusion of the solder from its supply container, and in the constant stirring to which the solder is subjected, which latter is apt to disintegrate when left undisturbed, so that then the more liquid components thereof are expressed first and the less liquid portion becomes stiff and cannot be expressed properly.

In order to make our invention more readily understood, we will now describe it in detail in connection with the accompanying drawing, in which Fig. 1 is a vertical section through a preferred embodiment of the invention as applied to a chain making machine; Fig. 2 is a vertical section through a modification in connection with a ring-mesh making machine; Fig. 3 is a section through Fig. 2 on line 3—3, and Fig. 4 is a section through our improvement as applied to the wire stop mechanism of a chain making machine. Figs. 5 and 6 are similar sections through a modification of the solder feeding mechanism, showing two different operative positions.

Referring first to Fig. 1, the link closing tool 1 of a chain making machine, which in well known manner is mounted in the machine head and is periodically reciprocated therein, is made hollow and its lower head portion 3 communicates with a branched-off container 4 for the plastic solder 5. A plunger 6 is freely mounted in the link closer 1 and is influenced in the one operative direction by a coil spring 7 and in the other direction by the periodically reciprocating machine part 8. From the lower end of the plunger extends axially the pusher needle 9. Upon descent of the machine part 8 the needle 9 enters the relatively restricted solder feed passage 10 in the closer-head 3, which passage communicates with the link closing recess 11 of the head 3 in well known manner, and in so doing pushes ahead of it a quantity of solder, which it then expresses into the link closing recess 11 and in between the two opposed faces of the link 100, which latter is held in partially closed state between the gripper jaws 12. The operations of the machine are so timed that immediately the solder tear enters the link joint, the latter is closed on descent of the closer 1, which completes the link shutting operation. This solder tear extrusion stage is shown in Fig. 1.

The pusher needle 9 in its lowermost position completely fills the solder passage 10 with solder and at the limit of its working movement terminates flush with the surface of the inner wall of the link closing recess 11 so that the latter presents a smooth surface throughout which assures a ridgeless clean joint. On ascent of the needle it will suck after it any excess of extruded solder paste.

For assuring continuous even operation it is necessary that the lower portion of the closer head 3 is always well filled with solder mass without having to be placed under internal pressure, and in order to allow the solder to recede upon descent of the plunger 6, there is provided in the supply cylinder 4 a piston 13 acted on by the coil spring 14, which allows the piston to recede in accordance with the pushed up solder mass. On return of the plunger the piston 13 again pushes down the solder to fill the head 3, care being taken that the spring 14 on its part is not sufficiently strong to express solder through the feed passage 10.

In order to prevent the solder composition from becoming disintegrated in the container, the plunger is oscillated or reciprocated curvilinearly about its longitudinal axis during each longitudinal reciprocation. For this purpose a pin 15 extends laterally from the plunger 6 and guidedly engages in a curved groove 16 in the closer wall 1, as shown in dotted lines in Figs. 1 and 4. To still further enhance the stirring action of the plunger we provide a stirrer tongue or spoon 17, preferably in rigid connection with the plunger or the pusher needle respectively.

In the construction according to Figs. 2 and 3 the reference numeral 18 denotes the tool having the link closing recess 111, and 19 is the tool presenting the preformed link 20 of mesh work. The former tool 18 is operated in well known manner by means of the cooperating wedge slides 21 and 22. In this construction the solder container 23 is rigidly mounted on the machine head 24 and the pusher needle 25 is reciprocated therein by means of a reciprocable machine part 250. The solder tear forced out of the lower orifice of the solder feed passage is wipingly taken along by the laterally advancing link closer 18 and is then deposited between the opposed link ends which then immediately are closed.

The construction and operation of the improvement in connection with a modified type of soldering machine in which the link forming wire 26 is fed up against a stop and then bent with the stopped wire end taking up the required amount of solder will be readily understandable from Fig. 4, in which the solder stirring and feeding means are practically the same as above described in connection with Fig. 1. The link wire 26 is run up against the stop 27, which in this instance is also the solder feeding device. The wire blank is cut off between the anvil 28 and the hammer knife 29, and is formed in well known manner between the link forming tools 30 and 31, the solder being fed in timed relation and measured quantities to the inner end of the wire blank.

Instead of imparting to the plunger a relatively short rotary reciprocation for stirring the solder mass, it could also be kept in continuous rotation, and the stirrer could be given the shape of a screw or worm to constantly move the solder toward the feed passage. This latter arrangement is shown in Figs. 5 and 6, in which the plunger 6 is illustrated as longitudinally reciprocable within the closer head 3 under the opposed forces of parts 7 and 8. At the upper end a pulley 80 is provided and a driven endless belt 81 serves to rotate the plunger in the sense of the arrow. From the lower end of the plunger extends the pusher needle 9 which is surrounded by a helical stirring and feeding screw 90, designed for constantly stirring the solder and feeding it toward the feed orifice 10 in the closer head during the compound movement of the plunger. In its lowermost position, shown in Fig. 6, the face of the pusher needle extends flush with the respective top wall of the link closing recess 11 and has pushed the requisite amount of solder 5 into the funnel-shaped stop head, into which latter the forward end of the fed wire blank or the already partly closed wire link is pushed to take up the extruded solder portion.

What we claim is:—

1. In a soldering machine of the type set forth, including cooperating link forming tools, a solder container, a solder feed passage through the end wall of said container, a reciprocatory member operative in timed relation to the link forming operation, and a pusher needle actuated by said member for cooperation with said container passage.

2. In a soldering machine according to claim 1, the feature that one of the link forming tools is formed as solder container and the solder is fed by the needle to the solder zone through this tool.

3. In a soldering machine according to claim 1, means for imparting to the needle movement about its axis during each longitudinal reciprocation.

4. In a soldering machine according to claim 1, a solder stirring member operative simultaneously with the pusher needle.

5. In a soldering machine according to claim 1, means for keeping the solder massed in front of the container passage, comprising an additional solder container in open communication with the first container, and readily yieldable solder loading means in this additional container, the loading capacity of this loading means normally being insufficient to express solder through the solder passage in the first container.

6. In a soldering machine of the character set forth, including cooperating link forming tools, a solder container, a solder feed passage through the end of said container, a feed member mounted in said container for relative reciprocation therein, and means for imparting to said member a rotary movement in addition to its longitudinal reciprocatory movement.

7. In a soldering machine according to claim 1, the feature that the needle has a curvilinear movement in addition to its rectilinear and carries a stirrer for stirring the solder.

8. In a soldering machine according to claim 1, the feature that the needle has a rotary movement in addition to its reciprocatory movement and carries a helical stirrer movable therewith.

9. In a soldering machine, a solder container having an outlet, a reciprocatory needle for expressing solder through said outlet, and solder stirring means operative with the needle.

10. In a soldering machine, a solder container having an outlet, a needle for expressing solder through said outlet, said needle having a rectilinear feed movement and a curvilinear movement, and a stirrer actuated by said curvilinear movement for stirring the solder.

11. In a soldering machine, a solder container having an outlet, a reciprocatory needle for expressing solder through the outlet, means for reciprocating the needle, and a stirrer movable in a curved path as the needle reciprocates, for preventing the solder from packing and maintaining a uniform consistency thereof.

JONATHAN WENZ.
JOSEF ALVERA.
GEORG BRUNHÜBNER.